United States Patent [19]
Baeuerle et al.

[11] Patent Number: 5,442,918
[45] Date of Patent: Aug. 22, 1995

[54] AUTOMATIC SUPERCHARGING CONTROL SYSTEM FOR AN INTERNAL COMBUSTION ENGINE

[75] Inventors: Michael Baeuerle, Besigheim-Ottmarsheim; Werner Haeming, Neudenau-Herbolzheim; Wolfgang Hilbert, Moeglingen; Ulrich Rothhaar, Stuttgart; Robert Sloboda, Markgroeningen; Oskar Torno; Stefan Unland, both of Schwieberdingen; Iwan Surjadi, Vaihingen/Enz, all of Germany

[73] Assignee: Robert Bosch GmbH, Stuttgart, Germany

[21] Appl. No.: 77,792

[22] Filed: Jun. 16, 1993

[30] Foreign Application Priority Data

Jun. 17, 1992 [DE] Germany .......... 42 19 719.0

[51] Int. Cl.$^6$ .......... F02B 37/12
[52] U.S. Cl. .......... 60/602
[58] Field of Search .......... 60/600–603; 123/564

[56] References Cited

U.S. PATENT DOCUMENTS 4,660,382 4/1987 Ueno et al. .......... 60/602
4,672,814 6/1987 Abo et al. .......... 60/602
4,781,027 11/1988 Richter et al. .......... 60/602
5,123,246 6/1992 Younessi et al. .......... 60/602

Primary Examiner—Michael Koczo
Attorney, Agent, or Firm—Kenyon & Kenyon

[57] ABSTRACT

A system for automatically controlling the supercharging of an internal combustion engine by controlling a variable parameter signal, such as pressure, air quantity, or air mass which characterizes the status of the internal combustion engine supercharging operation. The system includes a closed-loop control system. To optimize supercharging performance the response characteristic of the control system is determined as a function of the rotational frequency of the internal combustion engine and an operating parameter signal which characterizes the dynamic output response of the internal combustion engine and of the supercharger. In the case of large system deviations, the operating parameter signal is derived from the actual measured value of the control variable. The control system raises the value of the operating parameter signal when the control system is deactivated to avoid making an incorrect determination of the value of the operating parameter signal when the control system is then immediately reactivated. When small system deviations occur, the control system operates based on the assumption that the engine and supercharger are operating at a steady-state condition. Under such conditions, the control system uses a stored value for the value of the operating parameter signal.

17 Claims, 3 Drawing Sheets

AUTOMATIC SUPERCHARGING CONTROL SYSTEM FOR AN INTERNAL COMBUSTION ENGINE

FIELD OF THE INVENTION

The present invention relates to engine control systems. More particularly, the present invention relates to a system for automatically controlling the supercharging of an internal combustion engine.

BACKGROUND OF THE INVENTION

One known method for controlling the supercharging pressure of an internal combustion engine is described in European Patent No. 0 323 754 B1. In accordance with the described method, an acquired actual supercharging pressure value is compared to an auxiliary value, which is smaller than a set-point value. While the actual value is less than the auxiliary value, a device specifying the rate of increase of the supercharging pressure is triggered to stipulate the maximum increase rate of the supercharging pressure. The value of the maximum increase rate can depend on the measured actual increase rate of the charge-air pressure, on the gear speed that is set, or on the temperature of the intake air.

A device for controlling the supercharging pressure of an internal combustion engine with a turbocharger is described in German Patent 33 03 350 A1. The disclosed control device includes an open-loop control system and a closed-loop control system. A desired supercharging pressure is roughly adjusted by the open-loop control system by a control unit that adjusts the supercharging pressure. The control unit that adjusts the supercharging pressure is set for one manipulated variable based on empirically determined values. The closed-loop control system then corrects the supercharging pressure adjusted by the open-loop control system to reduce deviations of the adjusted supercharging pressure from the desired supercharging pressure.

A fuel-regulating device for gas-turbine engines is described in German Patent 19 02 356 B2. This regulating device has a proportional, integral, differential ("PID") action response. The weighting of the proportional, integral, and differential components according to specific functions is variable and depends upon the rotational frequency of the engine. No parameters, other than rotational frequency, are used in the weighting of the components.

The object of the present invention is to render possible optimal automatic control of the supercharging of an internal combustion engine. Above and beyond that, an object is to minimize the complexity of the supercharging control system. These and other objects are solved by the system and method of the invention described below.

SUMMARY OF THE INVENTION

The method and apparatus of the present invention provide an optimal level of automatic control for supercharging an internal combustion engine. In accordance with one embodiment of the present invention, after an automatic control circuit has been activated, the transfer function of a loop controller is varied initially as a function of the rotational speed of the internal combustion engine and an operating parameter g. The operating parameter g represents the initial state of the internal combustion engine and the supercharger at the time the automatic control circuit is activated. In this manner, operation of the automatic control circuit is initiated using an optimal transfer function, with emphasis being initially placed on achieving a desired set-point value as rapidly as possible.

A reset stage may be used to avoid incorrect values for the operating parameter g. Without the use of a reset stage, g-values may occur, for example, as the result of a short-term transition into deceleration during a switching operation. Such g-values do not optimally reproduce the actual initial state of the internal combustion engine and the supercharger.

In the case of quasi-steady-state operating conditions, a suitable value is preset for the operating parameter g. The response characteristic of the controller is determined as a function of the preset g-value which, given quasi-steady-state operating conditions, provides an optimal level of automatic control of the internal combustion engine's supercharging system. When the preset g-value is used during automatic engine control, emphasis is placed on the precise and stable automatic control of supercharging operation.

In one particular embodiment of the present invention, the coefficients, which determine the response characteristic of the controller, are stored in engine characteristics maps. The coefficients are stored in the maps as a function of the rotational frequency of the internal combustion engine and the operating parameter g.

In accordance with another embodiment of the present invention, at least one of the coefficients which determine the response characteristics of the controller has a fixed value. This fixed value is calculated during the application phase according to a method of manipulated-variable selection and is then stored in a storage device. This procedure reduces the number of engine characteristics maps that must be optimized in the application phase and, thus, reduces the required application time. Furthermore, assigning at least one coefficient a definitive value has the additional advantage of enhancing the stability of the controller.

DETAILED DESCRIPTION

Figure 1:
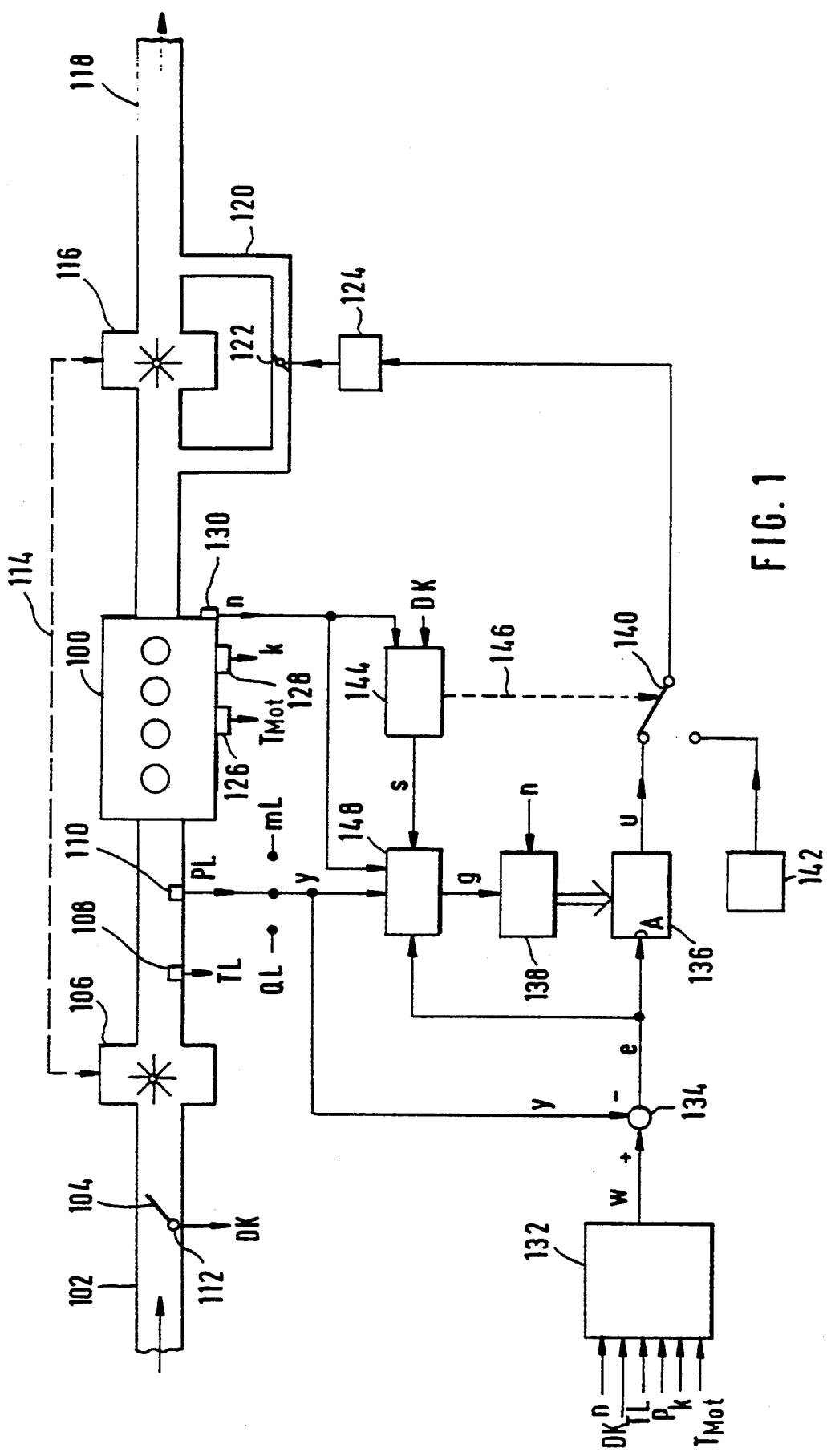
FIG. 1 shows a schematic block diagram of a system for automatically controlling the supercharging of an internal combustion engine implemented in accordance with one embodiment of the present invention.

Referring now to the drawings and initially to FIG. 1, there is shown a system for automatically controlling the supercharging of an internal combustion engine 100, implemented in accordance with one embodiment of the present invention. The internal combustion engine 100 draws air in through an intake section 102 into the internal combustion engine 100. Viewed in the direction of air flow, a throttle valve 104, a compressor 106, a temperature sensor 108, and a pressure sensor 110, are installed in the intake section 102. The temperature sensor 108 measures the temperature TL, of the suctioned air while the pressure sensor 110 measures the pressure PL, of the suctioned air. The position of the throttle valve 104 is detected by means of a sensor 112, which generates a throttle valve position signal DK. A connection means 114 couples the compressor 106 to a turbine 116 which is mounted in an exhaust manifold 118 of the internal combustion engine 100. In this manner, the turbine 116 drives the compressor 106 via the connection means 114. A portion of the exhaust-gas flow can be made to bypass the turbine 116 by way of a bypass duct 120 that is mounted within the exhaust manifold 118. Mounted in the bypass duct 120 is a valve 122, which enables the bypass duct 120 to be completely or partially sealed. The position of the bypass valve 122 is controlled by a bypass valve control device 124 (valve 122 and control device 124 forming a supercharger controller) which is coupled to the valve 122.

Mounted on the internal combustion engine 100 are sensors 126, 128, and 130, which measure the engine temperature, $T_{mot}$, knock data signal k for analyzing combustion knocking, and the rotational frequency n of the internal combustion engine 100, respectively. The signals $T_{mot}$, k and n generated by the sensors 126, 128, 130, respectively, in addition to the throttle valve position signal, DK, air temperature signal, TL, and the signal p, indicative of the atmospheric pressure, are supplied to a set-point selection block 132 after appropriate conditioning by electronic devices when necessary. A set-point signal w output of set-point selection block 132 is coupled to a summing input of adder 134. The adder 134 has a subtracting signal y input for receiving a signal y. The signal y can be, for example, the pressure, PL, of the suctioned air detected by the sensor 110. In place of the pressure PL, the signal y can also embody the air quantity, QL, or the air mass, mL, which can be obtained through use of suitable sensors.

The adder 134 (system deviation signal generator) has a deviation (e) signal output coupled to a first input of the performance control block 136. The output of a second control block 138 is coupled to a second input of the performance control block 136. In this manner, the performance control block 136 (performance controller) can receive signals from the second control block 138. The performance control block 136 generates an output signal u. A signal u output of the performance control block 136 is coupled to a first input of a switch 140. A second input terminal of the switch 140 is coupled to the output of a read only storage device 142. A third terminal of the switch 140 is coupled to the input of the bypass valve control device 124. By operating the switch 140, a connection may be established between the performance control block 136 and the valve control device 124, or between the read-only storage device 142 and the valve control device 124. The transition between these two circuit connections is controlled by a control unit 144, as a function of the control unit's input signals DK and n. The control unit 144 is coupled to the switch 140 by a control line 146.

The control unit 144 has a signal s output which is coupled to a corresponding signal s input of the first control block 148. The first control block 148 further comprises a signal n input coupled to the output of the rotational sensor 130, a signal y input coupled to the pressure sensor 110 and a signal e input coupled to the adder 134. In this manner, the first control block 148 receives the rotational speed sensor signal n and the pressure signal y. The first control block 148 generates a first control signal g which is supplied to the second control block 138, via a signal g input that is coupled to a signal g output of the first control block 148.

Devices 102 through 130 operate in a manner that is the same as, or similar to, corresponding known devices for supercharging the internal combustion engine 100. These devices will therefore not be described in greater detail.

In accordance with the present invention, the closed-loop control system depicted in FIG. 1 provides for optimum closed-loop control of the supercharging of the internal combustion engine 100. The closed-loop control system includes the individual components identified by the reference numerals 132 through 148. The closed-loop control system controls the supercharging of the internal combustion engine 100 so that supercharging control acquired as a function of a measured value signal y is adjusted to a set-point value signal w. The set-point value signal w is determined by set-point selection block 132 as a function of the value of the engine rotational frequency signal, n, throttle valve position signal, DK, air temperature signal, TL, atmospheric pressure signal p, combustion knock data signal k, and the engine temperature signal, $T_{mot}$. In a first adder 134, the measured value signal y is subtracted from the set-point value signal w and, in this manner, a system deviation signal e is calculated. A deviation signal e output of the adder 134 is coupled to a corresponding input of the performance control block 136 and first control block 148 so that the performance control block 136 and the first control block 148 receive the value e from adder 134.

To achieve optimal closed-loop control, the response characteristic of the performance control block 136 is optimized by the second control block 138. The optimization process is a function of the operating parameters of the internal combustion engine 100 and of the supercharger, including the Compressor 106, the turbine 116, connection means 114, and the bypass duct 120, together with the valve 122. One of the operating parameters is the rotational speed, n, of the internal combustion engine 100 measured by the sensor 130. Another operating parameter representing the first control signal, g, indicates how quickly the supercharger can reach a desired level of supercharging performance starting from the operating state at that particular moment in time. If the value of the first control parameter signal g is high, it indicates that the supercharger can rapidly achieve the desired level of supercharging performance. Given a low value for g, a somewhat longer time elapses until the desired supercharging level is realized.

In accordance with the present invention, the first control parameter signal g may be used to alter the response of the supercharger closed-loop control circuit. This makes quick and precise adjustments to achieve the desired level of internal combustion engine supercharging possible. The first control parameter signal g is generated as a function of signals y, e, n, and s.

Signal s indicates the circuit state of switch 140, which is used to deactivate closed-loop control of the supercharging operation. When the closed-loop control is activated, then the control device 124 receives its input signals from the performance control block 136. However, when the closed-loop control is de-activated, the control device 124 receives its input signals from the read-only storage 142. Accordingly, when closed-loop control is de-activated, no closed-loop control of the supercharging operation takes place. In such a case, the control device 124 operates to position valve 122 to a position specified by the read-only storage 142.

Control unit 144 controls the position of switch 140, as a function of the rotational frequency signal n and the throttle-valve angle signal DK, which serves as a load signal, to cause the activation or deactivation of the closed-loop control of supercharging operation. When threshold values n0 and $DK_0$, which correspond to the rotational frequency n and the throttle-valve angle DK are exceeded, the block 144 controls the switch 140 so that the closed-loop control is activated. When $n_0$ and $DK_0$ are not met, then the closed-loop control is de-activated.

Figure 2:
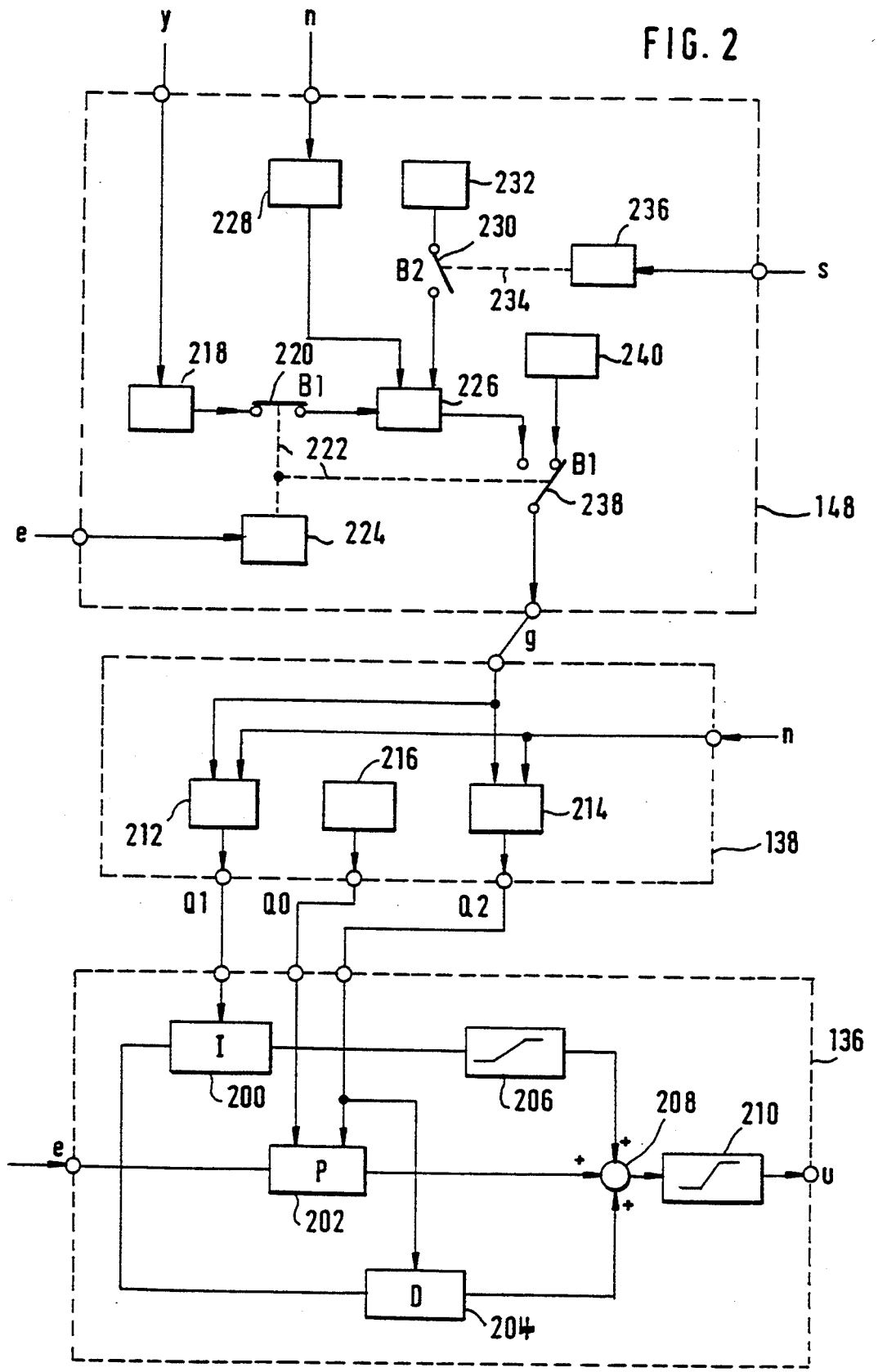
FIG. 2 is a schematic block diagram showing a first control block 148, a second control block 138, and a performance control block 136 which may be used as corresponding blocks of FIG. 1.

Referring now to FIG. 2, there is illustrated an exemplified embodiment of blocks 136, 138, and 148 of FIG. 1. The performance control block 136 includes an integral-action ("I-") controller 200, a proportional-action ("P-") controller 202, and a differential action ("D-") controller 204. As an input signal, each of the I-, P-, and D- controllers 200, 202, 204 receive the system deviation signal e supplied to the input of the performance control block 136. The performance control block 136 further includes a first limiter stage 206, a second adder 208, and a second limiter stage 210. The limiter stage 206 has an input coupled to the output of the I-controller 200 and an output coupled to a first summing input of the adder 208. The adder 208 has a second summing input coupled to the output of the P-controller 202, and a third summing input coupled to the output of the D-controller 204. The adder 208 adds the three signals to generate a composite signal which is supplied to the input of the controller's second limiter stage 210. The output signal from the second limiter stage 210, which is a generated variable signal u, is supplied to the output of the performance control block 136.

In addition to receiving the deviation signal e as a first input signal, the performance control block 136 receives a second through fourth control parameter signal, signals Q0, Q1, and Q2, respectively. These signals are generated by the second control block 138 and are supplied to the performance 136 control block via a second through fourth input, respectively. These signals are routed internally by the performance control block 136 to the I-, P-, or D-controllers. The signal Q1 is supplied to the I-controller 200 which has an input coupled to the second input of the control block 136. The second control parameter signal Q0 is supplied to a first input of the P-controller 202. The fourth control parameter signal Q2 input of the performance control block 136 is coupled to a second input of the P-controller 202 and to an input of the D-controller 204. In this manner, both the P-controller 202 and D-controller 204 receive the fourth control parameter signal Q2.

The operation of the performance control block 136 will now be described. The response characteristic of the I-controller 200, the P-controller 202, and the D-controller 204 can be represented by a corresponding response characteristic that can be influenced by at least one of the control parameter signals Q0, Q1, or Q2. The following equations represent response characteristics of the controller 200, 202, 204:

I-controller 200: $uI(j)=uI(j-1)+Q1*e(j-1)$ (1)

P-controller 202: $uP(j)=(Q0-Q2)*e(j)$ (2)

D-controller 204: $uD(j)=Q2*(e(j)-e(j-1))$ (3)

where, uI(j), uP(j) and uD(j) represent the I-, P- and D-components of the generated variable signal u at the time j, uI(—-) represents the I component of the manipulated variable signal u at the time j−1, and e(j) and e(j−1) denote the system deviation signal e at the times j and j−1, respectively. The control parameter signals Q0, Q1, and Q2, which are used as coefficients, are supplied to controllers 200, 202, and 204 as input signals Q0, Q1, and Q2. How large the components of the manipulated variable constituted by controllers 200, 202 and 204, i.e., how pronounced the proportional-action, the integral-action, and the differential-action components of the performance control block 136 are, depends on the coefficients Q0, Q1, and Q2. Consequently, the response characteristic of the performance control block 136 may be altered by the value of control parameter signals Q0, Q1, and Q2.

In addition, the response characteristic of the performance control block 136 is influenced by the limiter stages 206 and 210. The limiter stage 206 serves to limit the output signal from the I-controller 200 to avoid having too large an I-component of the generated variable signal u. This has the advantage, particularly in the case of a change in the operational sign of the system deviation, of allowing the time for integrating the remaining I-component to be reduced to an acceptable duration.

The second limiter stage 210 limits the generated variable signal u to a specified interval to ensure that the subsequent stages do not contain any unacceptable input signals.

The second control block 138, which generates the signals for the coefficients Q0, Q1, and Q2, includes the first and second engine characteristics maps 212 and 214, respectively, and a first read-only storage element 216. A value for the coefficient Q0 is stored in the first read-only storage element 216. The coefficients Q1 and Q2 are determined from the engine characteristics maps 212, 214, as a function of the rotational frequency signal n and the first control parameter signal g, which is supplied by the first control block 148.

The value stored in the first read-only storage element 216 for the coefficient Q0 is calculated in the application phase in accordance with the method for the set-point selection of a manipulated variable. The maximum system deviation, emax, and the maximum permissible manipulated variable, umax, are used to calculate the coefficient Q0 as follows:

$$Q0=umax/emax \quad (4)$$

The engine characteristics maps 212, 214 for coefficients Q1 and Q2 are determined in the application phase either through the application of a computer-aided design method or an empirical optimization method. If sufficient computer capacity is available in the engine operating phase, the coefficients Q1 and Q2 can be determined in real time from the current values of the rotational frequency signal n and the operating parameter signal g, without the use of engine characteristics maps.

When the coefficient Q0 is defined in accordance with the above formula, the degree of complexity of the application required, or the computer needed to calculate the coefficients Q0, Q1, and Q2 can be reduced considerably since only two coefficients, Q1 and Q2 out of the three coefficients Q0, Q1, and Q2, need to be optimized.

The first control block 148, which remains continually active, has the task of generating the first control parameter signal g from the signals y, e, n, and s. Thus, first control block 148 operates even when the closed-loop control system is not active.

The first control block 148 includes a characteristic signal block 218 which has an input coupled to the signal y input of first control block 148. The characteristic signal block 218 generates a raw signal of the operating parameter signal g. The raw signal g output of the characteristic signal block 218 is coupled to a first contact of a switch 220. The switch 220 is coupled by a control line 222 to a threshold stage control block 224, which controls the switch 220. The input of the threshold stage control block 224 is coupled to the signal e input of the first control block 148. A second contact of the switch 220 is connected to a first input of a low pass filter block 226.

The input of the characteristic curve signal block 228 is coupled to the signal n input of the first control block 148. The characteristic signal block 228 generates a low pass filter time constant signal as a function of the rotational frequency n of the internal combustion engine 100. The signal output of the signal block 228 is coupled to a second input of the low pass filter block 226. A third input of the low pass filter block 226 is selectively coupled via a switch 230, to the output of a read only storage element 232. The switch 230 is actuated by a reset stage 236 via a control line 234. The input of the reset stage 236 is coupled to the signal s input of first control block 148.

A signal output of the low pass filter block 226 is coupled to the output of first control block 148 via a switch 238, when the switch 238 is in a first position. Alternative to coupling the output of the low pass block 226 to the signal g output of the first control block 148 the switch 238 may be moved to a second position to couple the output of a read-only storage element 240 to the output of block 144. The position of the switch 238 is controlled by the signal output by the threshold stage 224.

The internal circuit elements of block 148 depicted in FIG. 2 enable the first control parameter signal g to be determined according to two methods. The threshold stage control block 224 determines which of the two methods will be applied and controls switches 220 and 238, accordingly. A criterion for making the decision is a comparison between the system deviation e and a specifiable threshold value $e_0$.

If the system deviation e is less than the threshold value $e_0$, then the first control parameter signal g is determined according to a first method. In accordance with the first method, the operating parameter signal g is read out of the read-only storage 240. The switch 220 is closed when this method is applied, and the switch 238 connects the output of the read-only storage 240 to the output of first control block 148. This first method is applied in the quasi-steady-state operating mode, and the signal g values determined with this method lead to coefficients Q1 and Q2, which result in a stable and precise automatic control of the supercharging operation.

On the other hand, if the system deviation e is greater than the threshold value $e_0$, then a second method is applied. In accordance with the second method, the non-linearized value signal g, generated by the characteristic signal block 218, from the actual value signal y, is supplied via the low pass filter 226 to the output of the first control block 148. When this second method is used, switch 220 is open, and switch 238 couples the output of the low pass filter block 226 to the output of the first control block 148. Thus, the signal g value found at the output of the low pass filter block 226 is held at the value to which it was adjusted when the control system was activated prior to the threshold value $e_0$ being exceeded by the value of the deviation signal e. This means that when determining the coefficients Q1 and Q2, the signal g-value is derived from the initial state, in which the internal combustion engine 100 and the supercharger found themselves when the threshold value $e_0$ was exceeded. If the system deviation signal e is greater than the threshold value $e_0$ right from the time of control system activation, then the value signal g determined immediately before activation of the control system is supplied to the output of the low pass filter 226.

The second method described above is frequently used during the initial phase of control system operation. After the control system has been activated, or when there are pronounced changes in the set-point value, and, thus, the third and fourth control signals Q1 and Q2, the second method permits an optimum control rate allowing for a large amount of control intervention.

The second method for generating the first control parameter signal g will now be described in greater detail. In accordance with the second method, using the characteristic signal block 218, the signal g value corresponding to the actual value signal y is continually determined as a function of whether the automatic supercharging control system is activated or deactivated. The dependency of the operating parameter signal g, on the actual value signal y, stored in the characteristic signal block 218, is defined in the application phase for the particular motor vehicle or engine type. For this purpose, the actual value signal y is defined for typical operational situations. In each case, an appropriate value for the operating parameter g is assigned. In one embodiment of the present invention, the first control parameter signal g assumes values between 0 and 1, whereby the value 0 corresponds to a deceleration operation, the value 0.5 corresponds to a low partial load, and the value 1 corresponds to an average partial load. Intermediate values can be determined, for example, through interpolation.

The current value of the first control parameter signal g is available at all times at the output of the characteristic signal block 218. However, the current signal g value is only routed via switch 220 to the input of the low pass filter 226 when the system deviation e is less than the threshold value $e_0$, or when the control system is deactivated. Thus, the signal g value ultimately supplied to second control block 138, differs from the signal g value currently output by the characteristic 218, since the second method of operation provides for switch 220 to be open. In such a case the connection between the output of the characteristic signal block 218 and the input of the low pass filter block 226 is interrupted. In generating the signal g value to be supplied to the second control block 138, the second method begins using a signal g value that was supplied to the output of the low pass filter block 226 immediately before switch 220 opened.

To achieve the most precise possible adaptation of the low pass filter 226 as a function of time, the time constant of the low pass filter 226, which establishes its response characteristic, is specified by a rotational frequency dependent characteristic signal block 228.

In certain operating states, a further alteration in the response characteristic of the low pass filter 226 is made. This additional intervention is always carried out when the reset stage 236 detects a deactivation of the control system, from its input signal s, representing a system transition from controlled into uncontrolled operation. In this case, the reset stage 236 briefly closes switch 230 and then quickly re-opens it so that the low pass filter 226 is connected to the output of the read-only storage element 232 for a short time span. This connection of short duration causes the low pass filter 226 to be reset to the value filed in the read-only storage 232. Resetting the low pass filter 226 at the moment of deactivation of the control system is intended to prevent a signal g value from being determined in the event the control system is re-activated in which case the signal g value would not optimally represent the actual initial state of the internal combustion engine 100 and the supercharger. This function of the control system will be described in greater detail below in regard to FIG. 4.

Figure 3:
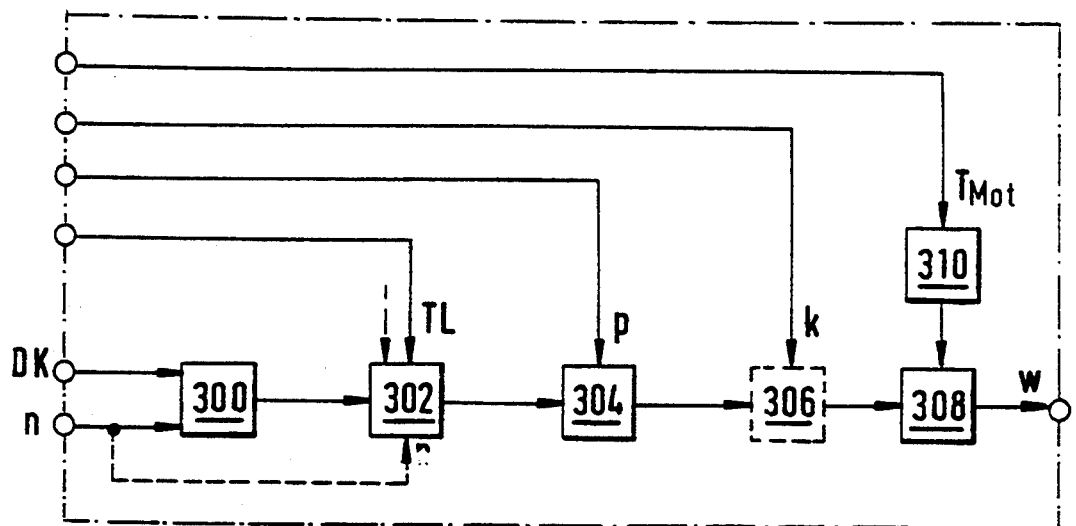
FIG. 3 shows a schematic block diagram of a circuit which may be used as the set-point selection block 132 of FIG. 1.

Referring now to FIG. 3, there is illustrated an exemplified embodiment of set-point selection block 132 of FIG. 1, which generates the set-point value signal w. The internal circuit elements of set-point selection block 132 receive the input signals n, DK, TL, p, k, and $T_{mot}$ via connection lines which are coupled to the corresponding inputs of set-point selection block 132. A first and second input of a first setpoint engine characteristics map 300 are coupled to the throttle-valve angle signal input of the set-point selection block 132 DK and the rotational frequency signal n input of the internal combustion engine 100, respectively. The output of the first setpoint engine characteristics map 300 is coupled to the input of a second setpoint engine characteristics map 302. The second setpoint engine characteristics map 302 has an additional signal input for receiving the temperature signal, TL, which is indicative of the temperature of the air drawn in by the internal combustion engine 100. In addition, the second setpoint engine characteristics map 302 can include another optional input for receiving a rotational-frequency signal n as depicted by the dotted line.

The output of the second setpoint engine characteristics map 302 is coupled an input of a third setpoint engine characteristics map 304. A signal indicative of the atmospheric pressure p, is supplied to another input of the engine characteristics map 304. The input of a knock reduction characteristics map 306 is coupled to the signal output of the third setpoint engine characteristics map 304. A signal k, indicative of combustion knocking, is applied to a second input of the knock reduction characteristics map 306. The knocking reduction characteristics map 306 is optional and can therefore be eliminated.

The output signal from the knocking reduction characteristics map block 306 is coupled to the input of a low pass filter block 308. The output of a fourth setpoint characteristic map 310 is coupled to a second input of the low pass filter block 308 for supplying the time constant of the low pass filter. The temperature signal $T_{mot}$, which is indicative of the internal combustion engine temperature, is supplied to the input of the fourth characteristic map 310.

The low pass filter block 308 generates the set-point signal value w, which is supplied to the output of set-point selection block 132. Further processing of the set-point signal w occurs as illustrated in FIGS. 1 and 2.

The set-point selection block 132 depicted in FIG. 3 functions in the following manner. The first setpoint engine characteristics map 300 supplies basic reference values for the set-point value signal w as a function of the throttle-valve angle signal DK and the rotational frequency signal n of the internal combustion engine. These basic values are corrected by the second setpoint engine characteristics map 302 as a function of the temperature signal TL of the air charge and, optionally, as a function of the rotational frequency signal n of the internal combustion engine. Another correction stage including a third setpoint engine characteristics map 302 follows the second setpoint engine characteristics map.

The third setpoint engine characteristics map 304 undertakes a correction as a function of the atmospheric pressure represented by the signal p. An optional knocking reduction characteristics map 306 follows. This map lowers the corrected basic values for the set-point value signal w, when combustion knocking occurs.

The low pass filter block 308 compensates for changes in the operating state of the internal combustion engine represented by the temperature signal $T_{mot}$. The time constant of the low pass filter block 308 is obtained from the fourth engine characteristics map 310 as a function of the temperature signal $T_{mot}$. In this manner, critical overshoot states can be avoided in the case of a cold engine.

Figure 4:
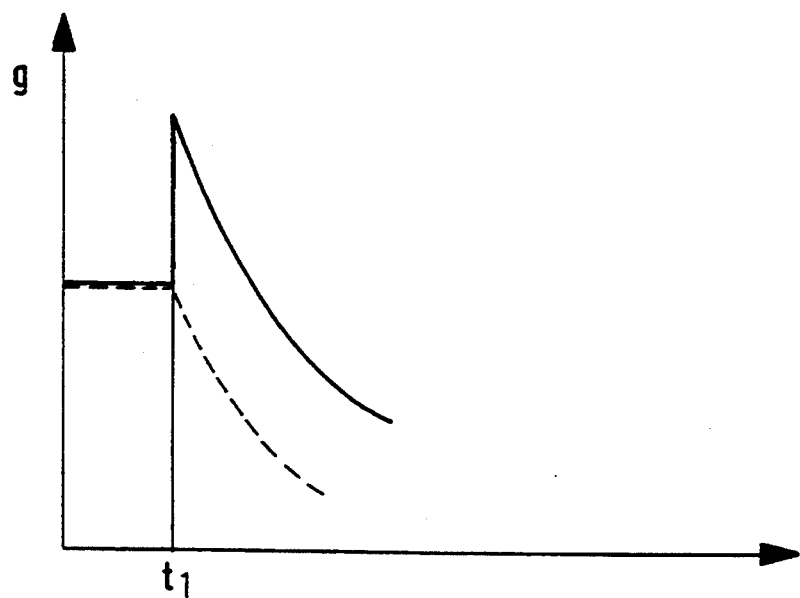
FIG. 4 is a graph of the signal pattern generated at the output of the low pass filter block 226 of FIG. 1.

FIG. 4 illustrates how the reset stage 236 influences the time characteristic of the signal g value at the output of the low pass filter block 226. The characteristic curve depicted as a solid line applies for the case when the low pass filter block 226 is reset at time $t_1$. The characteristic curve shown as a dotted line represents the case where no reset occurs.

At the instant $t_1$, indicated on the time axis, the driver lifts up his foot from the gas pedal, for example to shift gears or because he wants to reduce the driving speed. This causes the actual value signal y and, therefore, also the signal g value generated by the characteristic signal block 218 to drop abruptly as of $t_1$.

When the control system is deactivated because the pressure on the gas pedal is released, the switch 220 is closed, so that the output of the characteristic signal block 218 will be coupled to the input of the low pass filter block 226. Consequently, as of $t_1$, a low signal g value is specified for the low pass filter block 226, and the output signal from the low pass filter block 226 decreases accordingly. Such a result is illustrated by the curve in FIG. 4, represented by dotted lines, which is a function of the time constant of the low pass filter block 226. In contrast to the sudden change in the input signal supplied to the low pass filter block 226, the output signal generated by the low pass filter block 226 does not drop abruptly. However, it still decreases at a greater rate than corresponds to the actual operating state of the internal combustion engine 100 and of the supercharger.

If the control system is re-activated within a time interval dt after the instant $t_1$, then, without applying any additional measures, too low a signal g value would be output by the low pass filter block 226. This low signal g value would be supplied to the second control block 138. To avoid this, the reset stage 236 causes the low pass filter block 226 to be reset at the instant $t_1$. As a result, the g signal value output by the low pass filter block 226 rises rapidly at instant $t_1$ to the value stored in the read-only storage element 232, illustrated in FIG. 2. Then the signal g value output by the low pass filter block 226 subsides in accordance with the time constant of the low pass filter block 226 as illustrated by the solid curve. As a result, the solid curve runs above the dotted-line curve as of instant $t_1$ providing a better representation of the actual operating state than the dotted-line curve. The distance between the two curves is at a maximum value at instant $t_1$ after which time it decreases continuously. Consequently, the resetting of the low pass filter block 226 has the greatest effect when the control system is again activated immediately after $t_1$, e.g., when the switching operation is complete.

In connection with the system depicted here for automatically controlling the supercharging of an internal combustion engine, all signal variables characterizing the supercharging operation, such as the charge-air pressure, the air quantity, or the air mass, are suited as control variables. One skilled in the art would be familiar with adjusting the closed-loop control system to the selected controlled variable. For this adjustment, suitable sensors can be selected, and set-point values, characteristics, and engine characteristics maps can be dimensioned accordingly.

In place of the above-described PID action performance control block 136, one can also select other combinations consisting of at least one P- and/or at least one I- and/or at least one D- action controller.

In one embodiment of the present invention, an electromagnetic valve is employed, as the valve 122. The valve 122 is opened and closed either continuously or in accordance with a time cycle. In addition, as in the turbine 116, an optional bypass duct may be used with the compressor 106. The bypass duct of the compressor 106 may be used in addition to, or as a replacement for, the bypass duct of the turbine 116.

In another embodiment, in addition to, or in place of the bypass duct 120, or rather the bypass ducts, a supercharger with a variable geometry can be used to influence the supercharging operation. In such an embodiment, changes in the supercharger's geometry are controlled by the control device 124.

As an alternative to a turbine driven supercharger, a compressor that is mechanically driven by the internal combustion engine may be employed.

In yet another embodiment, the low pass filter block 226 is designed so as to allow the signal g value that it outputs not to rise to, but rather to rise by, the value stored in the read-only storage element 232 when it is being reset by the reset stage 236.

In another embodiment of the present invention, the low pass filter block 308 and the setpoint characteristic map 310 are dispensed with. In this refinement, the adaptation is made to the operating state of the internal combustion engine 100 via the limiter stage 206, which limits the output signal from the I-controller 200. For this purpose, the limiter stage 206 is designed to limit the output signal from the I-controller 200 as a function of the temperature signal $T_{mot}$ and/or as a function of the rotational frequency signal n of the internal combustion engine 100.

As described above, the present invention provides a method and apparatus for automatically controlling the supercharging of an internal combustion engine 100 by means of a closed-loop control system. Supercharging control is achieved by controlling a variable or parameter characterizing the supercharging of the internal combustion engine 100. To optimize the performance of the controlled system, the response characteristic of the performance control block 136 is determined as a function of the rotational frequency of the internal combustion engine 100 represented by the signal n, and by an operating parameter signal g, which characterizes the dynamic response of the internal combustion engine 100 and the supercharger. In the case of large system deviations, the operating control parameter signal g is derived from the measured, i.e., actual value, y of the control variable that characterizes the supercharging condition of the engine. By increasing the value of the operating parameter signal g when the control system is deactivated, the use of an incorrect value for the operating control parameter signal g is avoided when the control system is immediately reactivated after deactivation. In the case of small system deviations where the deviation signal e is small, the control system starts based on the assumption of a steady-state operating condition and uses a stored empirical value for the operating parameter signal g.

What is claimed is:

1. A system for controlling a supercharging operation of an internal combustion engine, comprising:
    a supercharger connected to the internal combustion engine;
    a supercharger controller connected to the supercharger and the internal combustion engine for controlling the supercharging operation;
    a system deviation signal generator for generating a system deviation signal as a function of an actual value of a first predetermined parameter representative of the supercharging operation;
    a control circuit coupled to the internal combustion engine and to the system deviation signal generator, the control circuit generating a control signal as a function of a rotational frequency of the internal combustion engine and the system deviation signal; and
    a performance controller connected to the system deviation signal generator for receiving the system deviation signal and to the control circuit for receiving the control signal, the performance controller generating a performance control signal, the performance control signal being transmitted to the supercharger controller for controlling the supercharger controller and, in turn, the supercharger, wherein the performance controller has a response characteristic determined as a function of the rotational frequency of the internal combustion engine and the actual value of the first predetermined parameter representative of the supercharging operation.

2. The system as recited in claim 1,
    wherein the control circuit generates the control signal as a further function of the first predetermined parameter representative of the supercharging operation, and wherein the response characteristic of the performance controller is determined as a further function of a second predetermined parameter, the second predetermined parameter being generated by the control circuit and determined as a function of the actual value of the first predetermined parameter.

3. The system as recited in claim 1, wherein the performance controller includes at least one of a proportional action controller, an integral action controller, and a differential action controller.

4. The system as recited in claim 3, wherein the the proportional action controller has a response characteristic according to the equation:

$$uP(j) = Q0 - Q2*e(j)$$

wherein,
- $uP(j)$ = a proportional component of a generated variable performance control signal u at time j;
- $Q0$ = a first predetermined control parameter signal;
- $Q2$ = a third predetermined control parameter signal; and
- $e(j)$ = a system deviation signal at time j.

5. The system as recited in claim 3, wherein the integral action controller has a response characteristic according to the equation:

$$uI(j) = uI(j-1) + Q1*e(j-1)$$

wherein,
- $uI(j)$ = an integral component of a generated variable performance control signal u at time j;
- $uI(j-1)$ = an integral component of the generated variable performance control signal u at time $j-1$;
- $Q1$ = a second predetermined control parameter signal; and
- $e(j-1)$ = a system deviation signal at time $j-1$.

6. The system as recited in claim 3, wherein the differential action controller has a response characteristic according to the equation:

$$uD(j) = Q2* (e(j-1) - e(j-1))$$

wherein,
- $uD(j)$ = an differential component of a generated variable performance control signal u at time j;
- $Q2$ = a third predetermined control parameter signal;
- $e(j)$ = the system deviation signal at time j; and
- $e(j-1)$ = a system deviation signal at time $j-1$.

7. The system as recited in claim 3, wherein each of the proportional, integral and differential action controllers has a response characteristic based on at least one of a first predetermined control parameter signal Q0, a second predetermined control parameter signal Q1, and a third predetermined control parameter signal Q2.

8. The system as recited in claim 7, wherein at least one of the control parameter signals Q0, Q1, and Q2 is generated by the control circuit via at least one characteristic map as a function of the rotational frequency of the internal combustion engine and a second predetermined parameter, the second predetermined parameter being generated by the control circuit and determined as a function of the actual value of the first predetermined parameter.

9. The system as recited in claim 8, wherein the control parameter signal Q0 is determined according to the equation:

$$Q0 = u_{max}/e_{max}$$

wherein,

- $u_{max}$ = the maximum value for a generated variable performance control signal u; and
- $e_{max}$ = a maximum value for the system deviation signal e.

10. The system as recited in claim 2, wherein, when the system deviation signal generated by the system deviation signal generator has a value that is greater than a predetermined value, the control signal generated by the control circuit has a value such that the performance controller has a response characteristic determined as a function of only the second predetermined parameter that is based on the actual value of the first predetermined parameter representative of the supercharging operation.

11. The system as recited in claim 2, wherein the first predetermined parameter representative of the supercharging operation includes at least one of a pressure of air drawn into the internal combustion engine, a quantity of air drawn into the internal combustion engine and a mass of air drawn into the internal combustion engine.

12. The system as recited in claim 2, wherein the performance control signal is selectively transmitted to the supercharger controller as a function of at least one operating parameter of the internal combustion engine.

13. The system as recited in claim 2, wherein the control circuit includes a first characteristic map having the first predetermined parameter as an input, a low pass filter being coupled to an output of the first characteristic map, the low pass filter outputting the second predetermined parameter.

14. The system as recited in claim 13, wherein the low pass filter includes a rotational-frequency-dependent time constant.

15. The system as recited in claim 13, wherein when the system transitions from a state of being activated to a state of being deactivated, the low pass filter is reset to generate a preselected value for the second predetermined parameter.

16. The system as recited in claim 1, wherein the performance controller includes a proportional action controller, an integral action controller, and a differential action controller, each of the proportional action, integral action and differential action controllers having an input for receiving the system deviation signal, an output of each of the proportional action and the differential action controllers being directly connected an adder circuit, an output of the integral action controller being connected to the adder circuit via a first limiter circuit, the first limiter circuit having a limit characteristic determined as a function of at least one of a preselectable value, a temperature of the internal combustion engine and the rotational frequency of the internal combustion engine, an output of the adder circuit being connected to an output of the performance controller via a second limiter circuit.

17. The system as recited in claim 2, wherein the control circuit includes a first portion and a second portion, wherein the first portion generates the second predetermined parameter as a function of the rotational frequency of the internal combustion engine, the system deviation signal and the first predetermined parameter and wherein the second portion generates the control signal as a function of the rotational frequency of the internal combustion engine and the second predetermined parameter, the control signal being provided to the performance controller.

* * * * *

UNITED STATES PATENT AND TRADEMARK OFFICE
CERTIFICATE OF CORRECTION

PATENT No. : 5,442,918

DATED : August 22, 1995

INVENTOR(S): Michael Baeuerle et al.

It is certified that error appears in the above-identified patent and that said Letters Patent is hereby corrected as shown below:

Column 5, line 44, "136 control block" should be --control block 136 --;

Column 6, line 3, "(3)" should be moved to end of line 2, to be parallel with equation; and Column 6, line 7, "(j--)" should be -- (j-1) --.

Signed and Sealed this

Fourth Day of June, 1996

*Attest:*

BRUCE LEHMAN

*Attesting Officer*     *Commissioner of Patents and Trademarks*